US006649887B2

(12) United States Patent
Budinger

(10) Patent No.: US 6,649,887 B2
(45) Date of Patent: Nov. 18, 2003

(54) APPARATUS AND METHOD FOR PROTECTIVE ATMOSPHERE INDUCTION BRAZING OF COMPLEX GEOMETRIES

(75) Inventor: David Edwin Budinger, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/822,127

(22) Filed: Mar. 30, 2001

(65) Prior Publication Data

US 2002/0139794 A1 Oct. 3, 2002

(51) Int. Cl.[7] .............................................. H05B 6/10
(52) U.S. Cl. ...................................... 219/615; 219/634
(58) Field of Search ................................ 219/615, 634, 219/602, 607, 604, 635, 616, 617, 627, 544, 643–645; 118/725, 720, 715, 733, 724; 228/194, 121, 195; 438/765; 117/89

(56) References Cited

U.S. PATENT DOCUMENTS

| | | | | |
|---|---|---|---|---|
| 4,622,445 A | * | 11/1986 | Matsen | 219/615 |
| 5,194,401 A | * | 3/1993 | Adam et al. | 438/765 |
| 6,147,334 A | * | 11/2000 | Hannigan | 219/544 |
| 6,368,404 B1 | * | 4/2002 | Gurary et al. | 117/89 |

* cited by examiner

*Primary Examiner*—Quang T. Van
(74) *Attorney, Agent, or Firm*—Carmen Santa Maria; McNees Wallace & Nurick LLC

(57) ABSTRACT

Apparatus for controlled-atmosphere brazing of parts or components having cross-sectional dimensions of up to twenty-four inches. The apparatus maintains the components or parts at a uniform temperature during the brazing cycle. The apparatus includes a susceptor having a physical boundary that separates an interior of the susceptor from its exterior. While there is no limitation upon the length of the parts or components that can be brazed, the wall of the susceptor formed as a physical boundary has an internal diameter that limits the maximum cross-sectional dimension of the parts or components that are to be brazed, so that the parts or components reside within the interior of the susceptor. A heating source for heating the susceptor is provided. The heating source is capable of heating the susceptor sufficiently so that the interior of the susceptor can reach a temperature sufficient to braze the components inside the susceptor. The susceptor containing the parts to be brazed and heating source are placed within a chamber that can provide a desired protective environment, such as a vacuum, an inert gas atmosphere, a reducing gas or nitrogen. The susceptor conducts and radiates the heat across its physical boundary so that a uniform temperature is attained and maintained within the interior of the susceptor during the brazing cycle. The susceptor is desirably comprised of graphite or a refractory metal.

29 Claims, 3 Drawing Sheets

APPARATUS AND METHOD FOR PROTECTIVE ATMOSPHERE INDUCTION BRAZING OF COMPLEX GEOMETRIES

BACKGROUND OF THE INVENTION

Metallic parts and components such as those used in aircraft engines sometimes are too complex to manufacture using standard techniques such as casting or machining due to part complexity because the components are manufactured from different materials. These parts also often require repair after damaged areas are removed. In order to accomplish the manufacture and/or repair of such parts and components, brazing is accomplished. Brazing entails utilization of a filler material that has melting point that is below the melting point of the base metals that must be joined or that is under repair. After application of the filler material, the region under repair is heated to an elevated temperature above the melting point of the filler metal but below the melting point of the base metal or metals. On cooling, the filler metal provides the joint between the parts or provides the repair area. If desired, suitable heat treatments can be applied to the region under repair to achieve diffusion between the base metal and the added filler metal so that the area that either forms the joint or that has been repaired can have properties, such as melting point, that are closer to the properties of the base metal than the original braze metal that was used as a filler.

Because of the high temperatures experience by aircraft engine parts, it is not always feasible to heat just the area that requires brazing. It frequently is necessary to prepare an article for brazing and than braze the entire article in a furnace under a protective atmosphere or under a vacuum. Because of the size of the vacuum furnaces and the furnaces having protective atmospheres, it is not economically feasible to manufacture or repair a single part or component. Instead, the parts or components are processed in batches of 40–50 parts by loading them into the furnace and achieving the desired atmosphere. For example, brazing using vacuum furnace processing for a batch of parts requires a time of about four hours to pump down the furnace to the required vacuum, ramping the part to the required temperature, holding the parts at the required brazing temperature for the required amount of time and cool down. These furnaces require a substantial amount of time to achieve the necessary vacuum, heat up slowly and cool down slowly, all due to their large volume and mass. This extensive time does not include the time required to load and unload the batch of parts. And of course, this batch processing is limited to parts and components comprised of the same base materials and the same braze filler materials, and frequently to parts of the same or of similar configuration.

Another technique that is sometimes used to accomplish brazing is induction brazing. This process has been used to process individual parts in protective atmospheres, but is very limited. This process requires the design of a unique induction coil for each part configuration. The induction coil must closely conform to the part configuration in order to achieve uniform heating of the part or workpiece. Because of this drawback, the part configuration, and hence the induction coil, is generally limited to simple geometries typically having uniform thicknesses or displaying simple symmetry.

The current state of the art utilizes three stage vacuum furnaces to permit small batch flow, while still providing uniform heating of the components or parts being brazed. However, these vacuum furnaces are still large and display little improvement in cycle time, typically requiring three-hour cycle times. In addition, the vacuum furnace equipment is expensive and complex, so that replacement and repair of the equipment can become a major consideration.

What is needed is apparatus that permits the brazing of individual parts in a vacuum or under a protective atmosphere, in a quick, efficient and economical manner without restrictions on component or part geometry. As an option, the equipment should allow the individual parts to be processed on as continuous basis as well as on a batch basis. Ideally, the equipment should not be complex and expensive, and when possible, should not be large, so that it can occupy a small area of a manufacturing facility such as a table top, or if desired, can be mounted on a lab bench.

SUMMARY OF THE INVENTION

Apparatus is provided for controlled-atmosphere brazing of parts or components having cross-sectional dimensions of up to twenty-four inches. The apparatus comprises a susceptor having a physical boundary, typically at least one wall, that separates an interior of the susceptor from its exterior. The wall has an internal diameter that is slightly larger than the maximum cross-sectional dimension of the parts or components that are to be brazed, so that the parts or components can be received within the inner diameter or interior of the susceptor. There is virtually no limitation on the length of the part or component that can be brazed by the present invention. A means for heating the susceptor is provided. For example, the outer surface of the susceptor is surrounded by a heating source that can apply heat substantially uniformly to the susceptor. The heating source is capable of heating the susceptor sufficiently so that the interior of the susceptor can reach a temperature sufficient to braze the components inside the susceptor. The susceptor containing the parts to be brazed and heating source are placed within a chamber that can provide a desired protective environment, such as a vacuum, an inert gas atmosphere, a reducing gas or nitrogen.

The heating source is coupled to a temperature controller which controls the output of the heating source in the conventional manner to assure that sufficient energy is provided by the heating source to maintain the temperature on the interior of the susceptor within predetermined limits. The temperature of the space within the inner diameter of the susceptor may reach a temperature as high as 2400° F. However, the temperature within the susceptor must be controlled so that a minimum temperature above the liquidus of the braze filler material is reached, but that a maximum temperature set below the melting point of the base material of the parts or components being brazed is not exceeded. Temperatures can be controlled within ±1° by many controllers currently available, and temperature ranges within ±5.5° F. at 2200° F. are required to be maintained by the controller. The temperature at various points within the susceptor should vary by no more than ±15° F. and preferably by no more than about ±10° F., well within the capability of the controllers. The actual processing temperature selected will depend upon the base material being brazed and the braze filler material being used. The temperature controls are an important factor, as the ability to control the temperature within the susceptor is dependent on the ability of to control the heating elements.

After the parts have been placed into the chamber and the desired atmosphere has been achieved, heat is applied by the heat source to the susceptor until a predetermined temperature has been reached within the susceptor. The susceptor acts to redistribute and radiate heat through its interior, so that a substantially uniform temperature is attained throughout the interior of the susceptor. This uniform temperature within the interior of the susceptor also means that the parts or components that are located within the interior of the susceptor also attain a uniform temperature, even if there are substantial differences in cross sectional configuration along the length of the part or component.

The characteristics of the susceptor are that is must be stable at the elevated temperatures at which brazing is performed, so that it does not interfere with the brazing. The susceptor must be able to radiate heat across its boundary, and ideally should be a good conductor of heat so that hot spots do not form on the susceptor. Such hot spots could adversely affect the temperature uniformity along the interior of the susceptor. The susceptor should be manufactured using standard manufacturing techniques, and if desired, should be capable of being manufactured into complex shapes, although for most applications, simple configurations having constant cross-section are adequate. The susceptor ideally should be oxidation-resistant and should be resistant to thermal fatigue and thermal stress shocks.

An advantage of the present invention is that the susceptor when heated uniformly by a heat source can provide a uniform temperature distribution throughout its interior. Thus, parts or components that are positioned within the susceptor are heated in a uniform manner, even when cross-sections and thicknesses are substantially dissimilar and otherwise are heated unevenly. Thus, the problems associated with temperature uniformity and convection currents as well as location of the part or component in proximity to the heat source such as currently exists within state of the art furnaces are eliminated.

Another advantage of the present invention is that an induction coil can be used as a heat source for the susceptor, which can be loaded into a small chamber slightly larger than the susceptor, if desired after it has been loaded with the parts or components. Because parts of varying sizes and cross-sectional configurations can be loaded into the susceptor, simultaneously if desired, only one induction coil that can be arranged over the susceptor is required, even though a variety of parts or components can fit within the susceptor.

Still another advantage of using the susceptor of the present invention is that the use of a small furnace for processing of small batches of parts or components or for individual parts or components allows for drastic reduction of processing times. The desired atmospheres can be achieved in small furnaces much more quickly than in large furnaces, an heat up and cool down can be accomplished more expeditiously.

Still another advantage of the present invention is that the interior of the susceptor can be closed at either end to substantially isolate convection currents that may be present in the furnace from the interior of the susceptor. In addition, if the ends of the susceptor are sealed, it is possible to provide attachment points for vacuums or for protective gases so that the desired atmosphere can be obtained in the interior of the susceptor, without the necessity of maintaining the desired atmosphere throughout the entire furnace interior.

Yet another advantage of the present invention is that the brazing operations can be done using small furnaces that are positioned on work benches and occupy about 1/10 of the space that current furnaces occupy. Because many small furnaces can occupy the same amount or less space than current large furnaces, it is possible to braze many parts of different configuration and of different materials and at different temperatures simultaneously in the different furnaces. Each individual part can be processed more quickly than processing can be accomplished using present techniques Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present invention permits brazing to be done on individual components or on small batches of components of gas turbine hardware using small furnaces capable of being mounted on workbenches. Because the employment of the present invention makes use of small furnaces possible, the cycle time for a brazing cycle is reduced from 4 hours currently required for batch processing currently employed, to less than an hour while maintaining a substantially uniform temperature profile across the workpiece.

Figure 1:
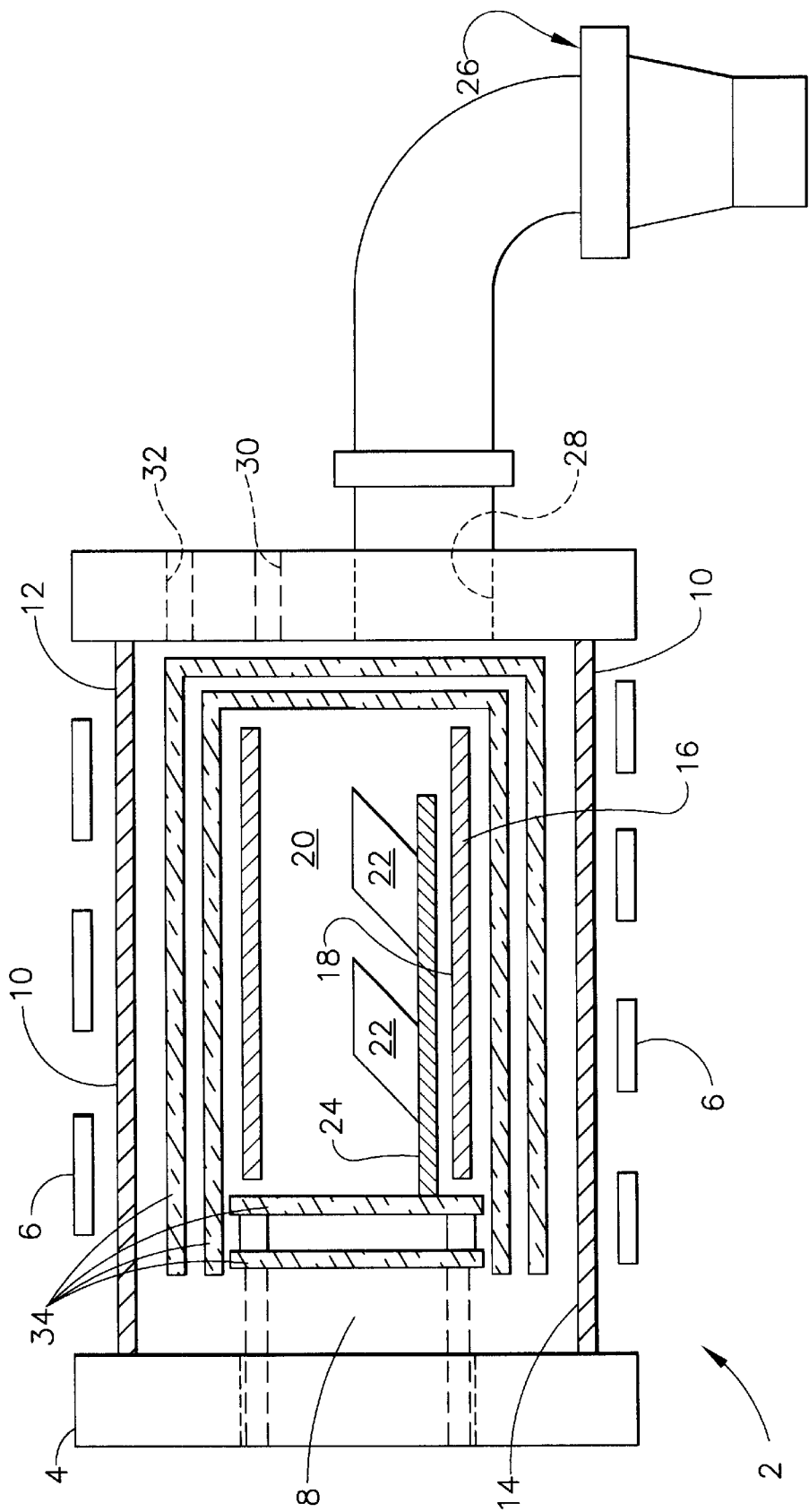
FIG. 1 is a cross-sectional representation of an vacuum induction-heated furnace that contains a susceptor loaded with airfoil parts.

FIG. 1 is a cross-sectional representation of the system of the present invention. The system 2 is comprised of a furnace 4. The furnace includes a heat source 6 that can introduce heat into a furnace chamber 8. As shown in FIG. 1, the heat source 6 is comprised of a series of induction coils that surround chamber 8 enclosed by chamber wall 10 having an exterior side 12 and an interior side 14, that is, the induction coils are located outside of exterior side 12 of chamber 8. However, as will be made clear, it is not necessary for heat source 6 to be located on exterior side 12 of chamber 8, although placement of the heat source may affect the mechanical and material construction of chamber 8. The heat source is controlled by a temperature controller 67. Susceptor 16 is positioned within chamber 8. Susceptor 16 is comprised of susceptor wall 18 that establishes a boundary between a susceptor interior 20 and the chamber, once susceptor 16 is positioned within furnace 4. As shown in FIG. 1, susceptor 16 is loaded with a pair of workpieces 22 that are brazed at an elevated temperature. The workpieces 22 are turbine nozzles that are positioned on an optional platform 24. The temperatures within chamber 8 and susceptor 16 are monitored and controlled by a plurality of thermocouples 69 placed at preselected positions and suitably connected to controller 67 that monitors the temperature from each thermocouple position and energizes or deenergizes the heat source in response to the temperatures from the thermocouples.

FIG. 1 also indicates one method for controlling the atmosphere within chamber 8. Although maintaining a desired atmosphere is a consideration in practicing the invention, the invention is not limited by the type of atmosphere maintained. As indicated in FIG. 1, a vacuum system is depicted. The vacuum system is comprised of a pump 26 that is in fluid communication with chamber 8. Pump 26 may be any suitable pump for drawing a vacuum such as a diffusion pump or a turbomolecular pump. Vacuum pump 26 is connected to an inlet 28. The vacuum pulled by pump 26 is monitored by a meter 30 that monitors the pressure and is connected to a controller (not shown). Also shown in FIG. 1 is a gas quench port 32 that can be connected to inert gas or nitrogen to provide rapid cooling of the interior chamber 8 and its contents when desired. Thermal shields 34 that minimize the heating of the chamber are interposed between the chamber wall 10 and the susceptor wall 18.

Figure 2:
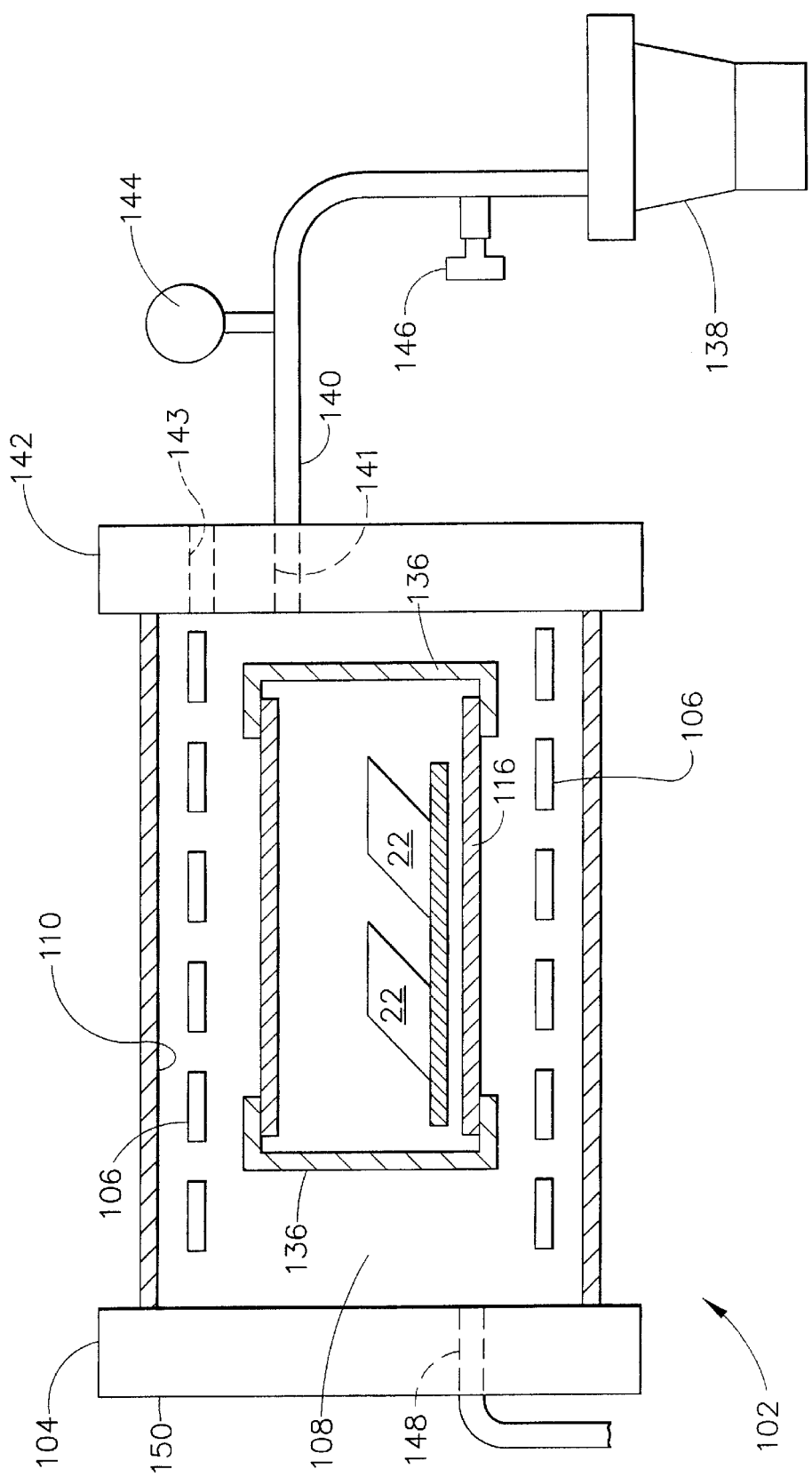
FIG. 2 is a cross-sectional representation of a non-reactive gas atmosphere induction furnace that contains a susceptor loaded with airfoil parts.

FIG. 2 presents a different embodiment of the present invention. The system is comprised of a furnace. Heat source 106 is positioned within chamber 108 on an interior side 114 of chamber wall and is connected to a controller 167. Heat source 106 is once again depicted as an induction coil surrounding susceptor 116, both of which are positioned within chamber 108. Susceptor 116 is comprised of susceptor wall 118 that establishes a boundary between a susceptor interior 120 and chamber 108, once susceptor 116 is positioned within furnace 104. In the embodiment of FIG. 2, heat shields are not shown, but may be included as needed to improve the heating efficiency of the susceptor and extend the life of the induction coils. As shown in FIG. 2, susceptor 116 is loaded with a pair of workpieces 22 that are brazed at an elevated temperature. The workpieces 22 are turbine nozzles that are positioned on an optional platform 124 supported by susceptor wall. In the embodiment shown in FIG. 2, the susceptor interior 120 is enclosed at either end by covers 136. The covers preferably are comprised of the same type of material as the susceptor, but may be insulation such as graphite/felt material that are simply fitted over the opening or openings of the susceptor. If required or if desired, the surfaces between the covers and the susceptor can be sealed with any well known high temperature sealant to completely isolate the susceptor interior from the furnace atmosphere. In this embodiment, the covers isolate the susceptor interior 120 from any gas currents occurring in chamber 108 that may affect the temperature uniformity within susceptor interior 120. The temperature within chamber 108 and susceptor 116 is monitored and controlled by a plurality of thermocouples 169 placed at preselected positions and suitably connected to controller 167 that monitors the temperature from each thermocouple position and energizes or deenergizes the heat source in response to the temperatures from the thermocouples.

In the embodiment depicted in FIG. 2, the atmosphere is controlled by purging the interior with a reducing gas such as hydrogen, nitrogen or an inert gas such as helium, argon or the like from gas source 138. The gas source 138 is connected to chamber 108 by a gas conduit 140 extending through a gas inlet 141 in a first end wall 142 of furnace 104. The gas pressure is controlled by a regulator system 144, 146 that controls and monitors the flow rate of the gas from gas source. The regulator system may be connected to a controller 167 with the capability to automatically control the flow of gas. The gas pressure within chamber 108 is monitored by a pressure sensor 143 extending into chamber 108. The pressure gage may also be connected to the controller to form part of the system for controlling gas. Gas from gas source 138 can serve the dual purpose of gas quenching when the brazing operations are complete, if desired. The gas is expelled from the chamber at a gas outlet 148 extending from the interior side 114 of chamber 108 to an exterior side. As shown in FIG. 2, gas outlet extends through a second end wall 150 opposite first end wall 142. It will be understood to those skilled in the art that the gas inlets and gas outlets can be located at any position on the periphery of chamber 108, and are not restricted to the locations shown in FIGS. 1 and 2. The temperatures within chamber 108 and susceptor 116 are monitored and controlled by a plurality of thermocouples 169 placed at preselected positions and suitably connected to a controller 167 that monitors the temperature from each thermocouple position and energizes or deenergizes the heat source in response to the temperatures from the thermocouples.

In a variation of the embodiment of the present invention, an inlet gas conduit from the gas source extends through chamber wall, across chamber 108, through one of the boundaries of the susceptor, such as a cover. An outlet gas conduit extends through a boundary of the susceptor in a second position, such as an opposite cover, where it can be expelled into the chamber. Alternatively the outlet gas conduit can further extend across the chamber 108 and through a chamber wall where it is exhausted.

The susceptor of the present invention can be any size that can fit within the furnace chamber or within the boundaries of the heat source. As depicted in FIGS. 1 and 2, the susceptor has a uniform cross-section and preferably is cylindrical in shape. However it is not so restricted and may assume any shape that can accept parts or workpieces and that can fit within the confines of the furnace chamber or the heat source. The susceptor may even be manufactured to assume the overall configuration of the part or components inserted into it, if this is found to provide an advantage. While it would appear that the susceptor of the present invention can be of any diameter, it is practically limited to a maximum diametral dimension of about 24" and to a minimum diametral dimension of about 2", and preferably to between about 6–15". The smallest of turbine parts are small engine turbine blades, and these are about 1–1.5" in girth or cross-section. Although there are many turbine engine parts that exceed about 24", above about 24" it becomes slightly more difficult to control the temperature distribution within the susceptor as the interior of the susceptor approaches the size of a standard furnace, and convection currents can begin to alter the uniform temperature distribution, and temperature control becomes more tenuous. A larger power supply to meet the increased power requirements of a larger susceptor also is problematic. The costs of the susceptors and power supplies 201 also increase substantially as the sizes increase. In addition, the limitations of small furnaces can be reached at the upper end of this size range, and it becomes practical to process these larger parts and components using the large vacuum induction furnaces of the prior art.

In operation, the susceptor is heated by the heat source, and then transfers heat by conduction and radiation across its walls to the susceptor interior. By proper placement and/or configuration of the heat source, the transfer of heat can be accomplished so that the temperature within the susceptor interior remains substantially uniform throughout the brazing process. Thus, parts or components located within the interior of the susceptor can be uniformly heated even when the parts or components include cross sections of substantially different thicknesses and sizes. Variations in temperature distribution that typically occur in furnaces due to configuration, convection or other reasons are virtually eliminated. However, the susceptor must have good heat transfer characteristics and ideally should radiate heat across its boundaries. It should have good workability, that is, it should be capable of being formed by machining or other suitable manufacturing techniques, either alone or in combination, into various suitable configurations with relative ease. The susceptor should also heat quickly, but should not be readily oxidizable at the elevated temperatures of brazing of the gas turbine components or parts. The susceptor must also be stable at these temperatures, meaning that is must have a melting temperature above the brazing temperatures of these parts and components, which brazing temperature is in the range of 1800–2350° F. However, since the temperature outside the susceptor, for example, in the chamber, may be higher than the brazing temperature within the susceptor interior, the susceptor should be made from a material preferably have a melting temperature in the range of at least 2300–2400° F., although a higher temperature is desired when possible. In order to have a long life at these elevated temperatures, the susceptor must also have good thermal fatigue properties and have good shock resistance. Some materials that satisfy all of these requirements include the refractory metals from Groups IVA, VA, and VIA, such as tantalum, molybdenum, tungsten, titanium and alloys of these materials. Graphite is also an acceptable material. Metals such as platinum may also have acceptable properties, but are not feasible due to their high cost. Such metals may find a use as a coating applied to susceptors manufactured from less costly materials. While titanium may be used, it also is an expensive choice that tends to oxidize rapidly even when the chamber is purged with a non-reactive gas or evacuated. Graphite also tends to oxidize rapidly if the atmosphere within the chamber is not carefully controlled, but has the advantage of being able to be machined into simple shapes cheaply. The choice of materials for a susceptor is not limited to these materials, and other acceptable materials that can provide a uniform temperature during heating may be used.

In the best mode of practicing the present invention, the heat source is an induction coil. A major advantage of the induction coil is that heating can be accomplished rapidly, thereby allowing rapid processing of parts through the furnace. It also is easy to manufacture in various sizes and can be readily placed inside or outside an induction furnace as indicated in FIGS. 1 and 2. A further limitation when using an induction coil as a heating source is that the material used as the susceptor must be capable of being heated by the induction fields. This limitation eliminates certain materials such as ceramics, including alumina, which are not heated by the induction field. These materials, however, are found to be useful for fixturing within the induction field as they are unaffected by it. However, the heat sources are not so limited and the use of different heat sources may permit the use of different materials for susceptors. Any of the heat sources that are used can be arranged to heat through the chamber, as in FIG. 1, or heat within the chamber, as in FIG. 2. For example, heating may be accomplished by an array of quartz lamps in the manner of superalloy welding at elevated temperatures (SWET welding). Alternatively, an electrical resistance coil can provide the heat required to heat the parts to their brazing temperature. Flame heating can be accomplished by impinging a gas flame on the susceptor, although the number and placement of the flame sources could be critical in maintaining a uniform temperature within the interior of the susceptor. It may be possible to directly heat the susceptor directly by applying an electric current directly to the susceptor, provided that the susceptor is comprised of a material that has sufficient resistance to dissipate the current as heat. Alternatively, it may be possible to heat the susceptor directly by sufficiently vibrating the susceptor molecules. As should be clear to one skilled in the art, the manner of heating the susceptor is not critical, so long as the susceptor can be heated in a manner so that heat is transferred across the boundaries of the susceptor in a uniform manner to heat the interior of the susceptor, and the parts or components within the interior, in a substantially uniform manner and quickly so that the cycle time for brazing can be reduced.

The present invention utilizing the susceptor may be used to braze a variety of parts including compressor vane sectors, stages 4–8, comprised of alloy 718 at brazing temperatures of 1925° F. High temperature turbine nozzles comprised of Rene' N5, Rene' N4, and Rene'142, all high temperature nickel base superalloys, have been successfully brazed at temperatures of about 2200° F. Shroud hangers comprised of Rene' 77, have been successfully brazed at 2125° F. Compressor vanes have been brazed at somewhat lower temperatures, about 1850° F., using AuNi and NiPd braze alloys.

Figure 3:
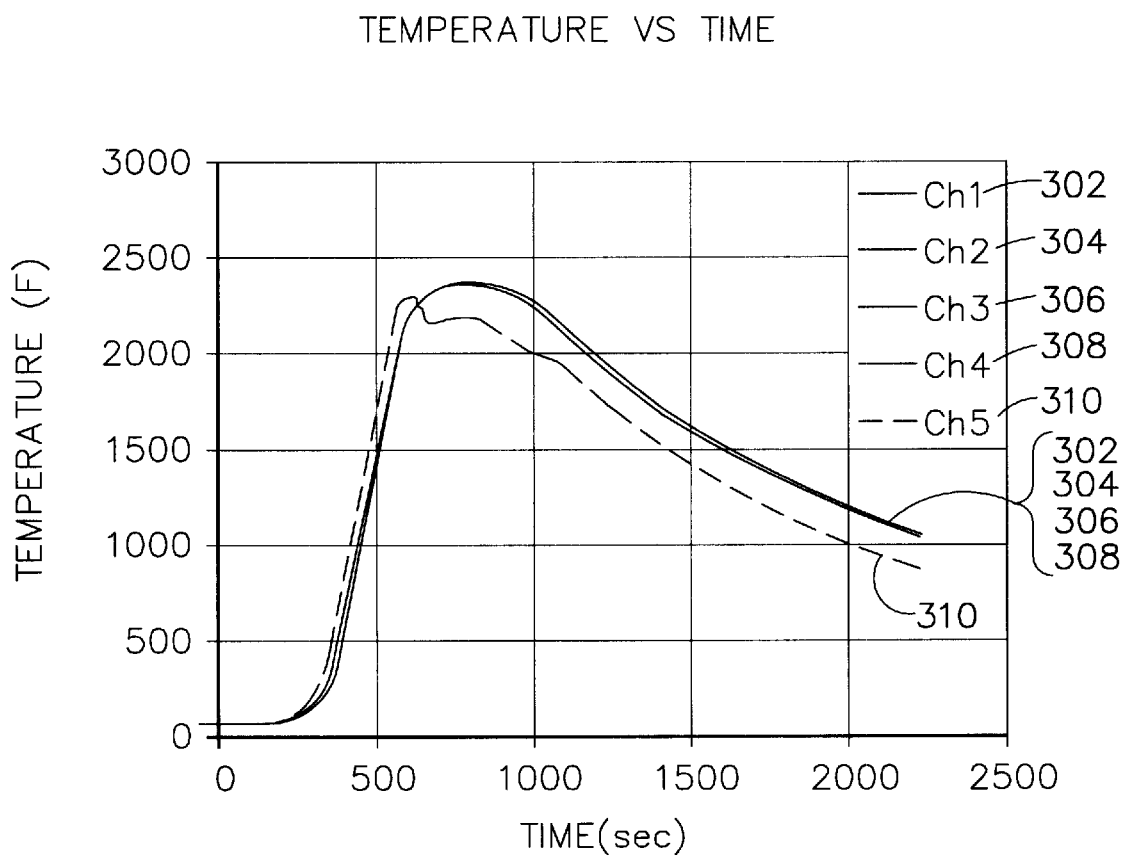
FIG. 3 is a temperature profile of several preselected points of a nozzle positioned within a susceptor of the present invention compared to the temperature profile of a position located on the exterior of the susceptor during one brazing cycle.
Figure 1:
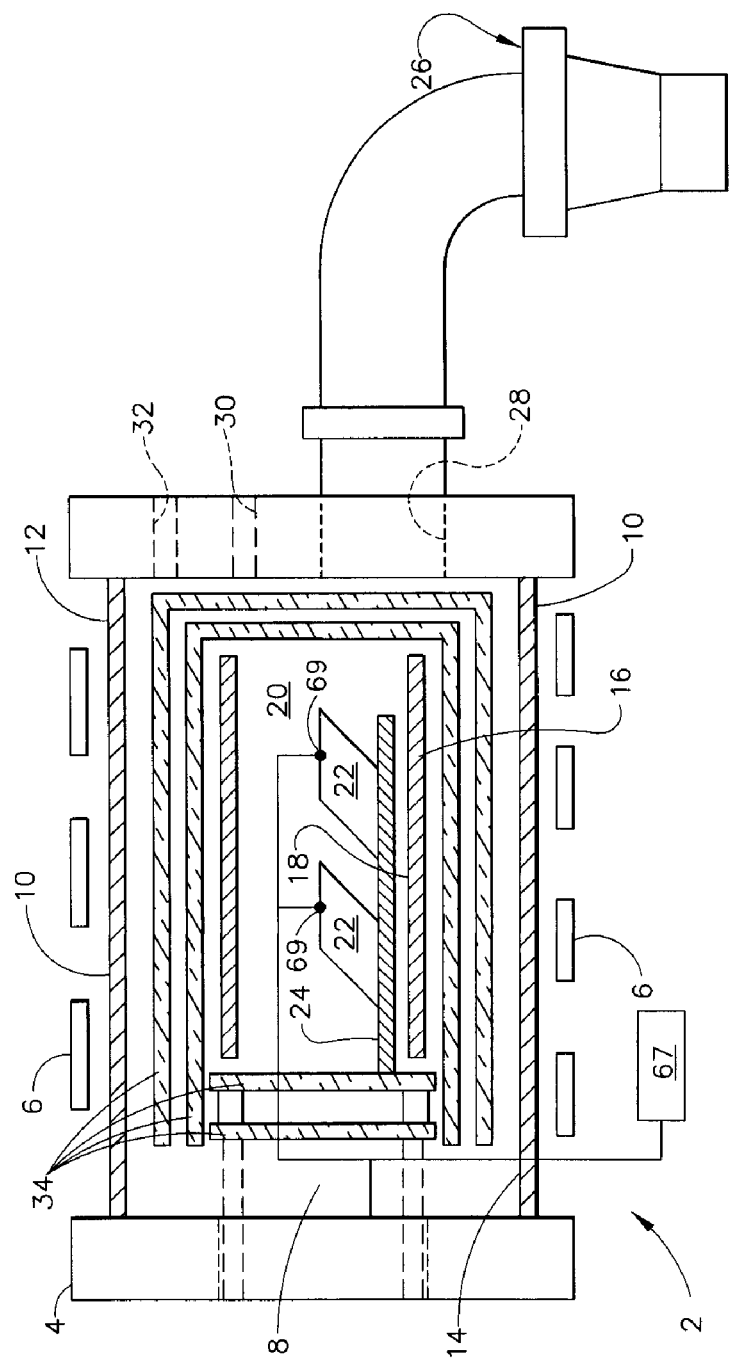
Figure 2:
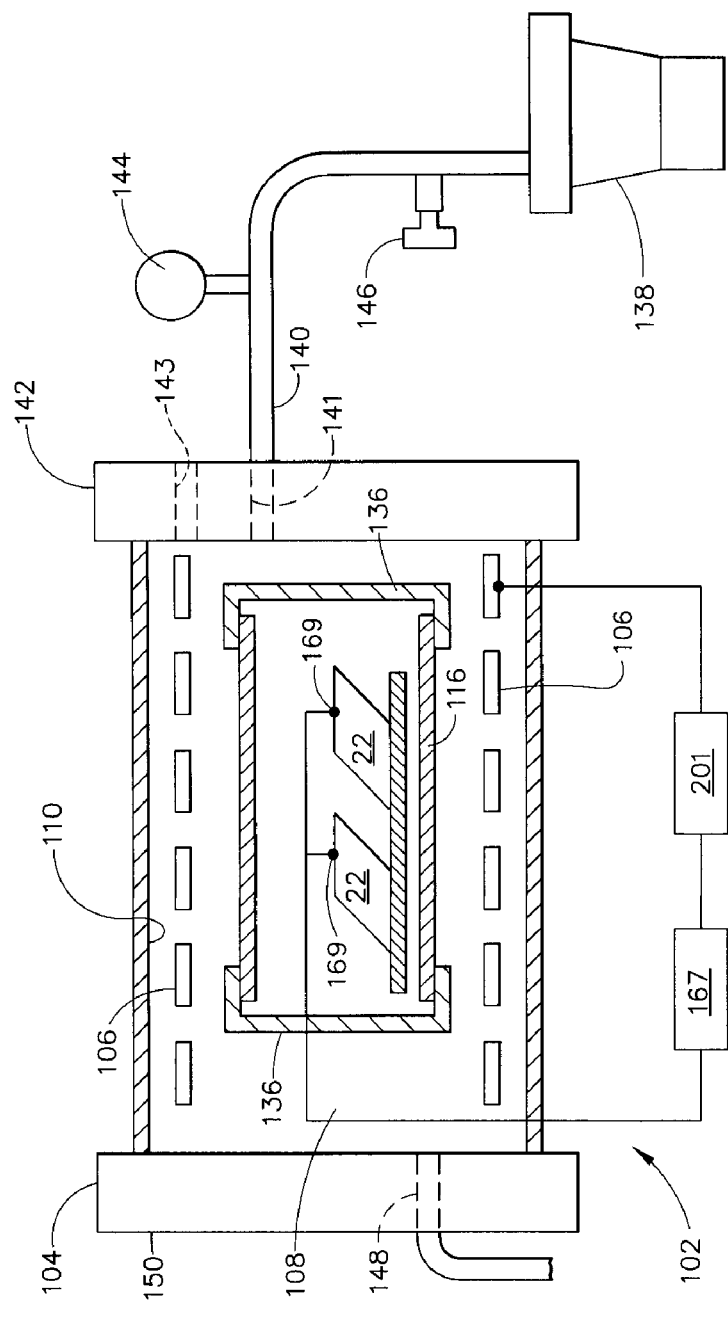

The temperature uniformity of the present invention was demonstrated by heating a turbine nozzle section comprised of Rene' N5. The nozzle segment, as is typical, has a variable cross-section, being a thin airfoil portion between thick end flange attachments. The nozzle segment was placed in a susceptor comprised of titanium tube having an inner diameter of eight inches. An insulating blanket comprised of silica was wrapped around the susceptor. The susceptor was placed in an eight-turn helical coil and induction heated. Four thermocouples were attached to the nozzle at preselected locations having thicknesses of between 0.060" to about 0.25". A fifth thermocouple was attached to the susceptor. The susceptor containing the nozzle was heated for 7–10 minutes. The results of the test are presented in FIG. 3. As can be seen, thermocouples attached to the nozzle indicated the temperature uniformity of the thermocouples attached to the nozzle throughout the temperature range. The four thermocouples attached to the nozzle at the four preselected locations yielded the temperature profiles indicated by 302, 304, 306 and 308 respectively of FIG. 3. As expected and as indicated by the thermocouples attached to the susceptor and the nozzle, on both heating and cooling, the susceptor's temperature response, as indicated by temperature profile 310 of the thermcouple attached to the susceptor, is faster than the temperature response indicated by profiles 302, 304, 306 and 308 of the nozzle positioned within the susceptor. The lag time of the nozzle temperature response is more pronounced on cooling than on heating, but this lag time can be controlled if desired by introduction of quench gases.

The system of the present invention can be designed as a multistage furnace having a plurality of independently controlled purge or vacuum chambers. While a first chamber is being loaded and adjusted to attain the required atmosphere, at least one independent chamber can be performing the heating operations required to accomplish the heating to the required temperature. The final chamber can be used for cooling. While the first and final chambers are being loaded and/or cooled, a single induction power can be used to heat the intermediate chamber or chambers so that a continuous flow of brazed components can be accomplished through a single, small furnace.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or

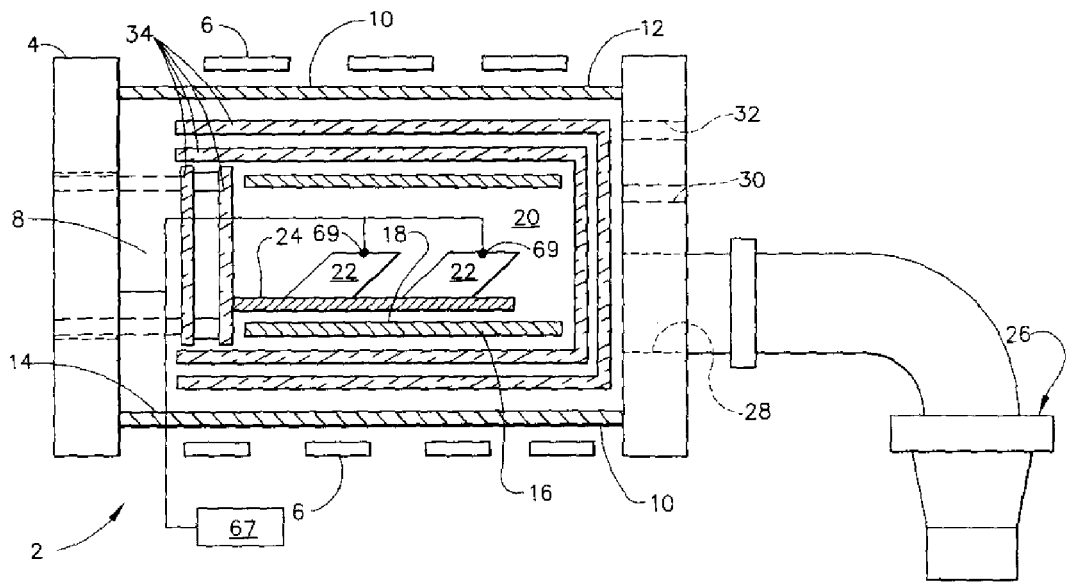

What is claimed is:

1. Apparatus for brazing of components, comprising:
   a susceptor, the susceptor having a wall forming an interior having a predetermined cross-sectional configuration and size, the wall separating an interior of the susceptor from an exterior surrounding the susceptor, the susceptor interior of a size sufficiently large for receiving components having a cross-sectional size up to the predetermined cross sectional size of the susceptor, wherein heating of the susceptor is accomplished at temperatures above a liquidus temperature of a brazing material without deterioration resulting from oxidation, thermal shock and thermal fatigue, and wherein the susceptor is a good thermal conductor and radiates heat to the interior;
   a chamber for receiving the susceptor;
   means for heating the susceptor to a temperature above the liquidus temperature of the brazing material; and
   means for controlling the temperature of the components above the liquidus temperature of the brazing material and below melting temperatures of the components.

2. The apparatus of claim 1 further including means for controlling an atmosphere around the components during thermal cycling.

3. The apparatus of claim 2 wherein the means for controlling the atmosphere includes a vacuum pump system in fluid communication with the chamber.

4. The apparatus of claim 2 wherein the means for controlling the atmosphere includes a gas source, wherein the gas source is selected from the group consisting of an inert gas, a reducing gas and combinations thereof, the gas source being in fluid communication with the chamber.

5. The apparatus of claim 2 wherein the means for controlling the atmosphere further includes a pressure sensor positioned within the chamber for sensing the pressure of the gas within the chamber, a pressure regulator for regulating the flow of gas from the gas source to the chamber, and a controller in communication with the pressure sensor and the regulator to adjust the flow of gas through the pressure regulator in response to the pressure of gas within the chamber.

6. The apparatus of claim 1 wherein the means for controlling the temperature of the components includes a controller for controlling the temperature in communication with the means for heating, and temperature sensors, the temperature sensors being positioned at predetermined locations within the chamber, each sensor providing signals to the controller indicative of a temperature at each predetermined location, so that the temperature controller can cycle the means for heating responsive to the temperatures from the sensors.

7. The apparatus claim 6 wherein the means for heating includes an induction coil electrically connected to a power supply.

8. The apparatus of claim 7 wherein the induction coil is positioned around the chamber.

9. The apparatus of claim 7 wherein the induction coil is positioned around the susceptor.

10. The apparatus of claim 6 wherein the means for heating is a resistance heater electrically connected to a power supply.

11. The apparatus of claim 10 wherein the resistance heater is the susceptor electrically connected to the power supply.

12. The apparatus of claim 10 wherein the resistance heater is positioned around the susceptor.

13. The apparatus of claim 6 wherein the means for heating includes at least one quartz lamp electrically connected to a power supply.

14. The apparatus of claim 13 wherein the at least one quartz lamp is positioned around the chamber.

15. The apparatus of claim 14 wherein the at least one quartz lamp is positioned around the susceptor.

16. The apparatus of claim 1 wherein the chamber is a furnace capable of being mounted on a workbench.

17. The apparatus of claim 1 wherein the means for heating includes a power supply electrically connected to at least one means for heating selected from the group consisting of quartz lamps, resistance heaters, induction coils and combinations thereof.

18. The apparatus of claim 17 wherein the means for heating further includes a gas flame.

19. Apparatus for brazing of components, comprising:
   a susceptor, the susceptor having a wall forming an interior having a predetermined cross-sectional configuration and up to about 24 inches in cross-section, the wall separating an interior of the susceptor from an exterior surrounding the susceptor, the susceptor interior of a size sufficiently large for receiving components having a cross-sectional size up about 24 inches in cross-section, wherein heating of the susceptor is accomplished at temperatures above about 1500° F. without deterioration resulting from oxidation, thermal shock and thermal fatigue, and wherein the susceptor is a good thermal conductor and radiates heat to the interior;
   a chamber for receiving the susceptor;
   means for heating the susceptor to a temperature above at least about 1500° F.;
   means for controlling the temperature of the interior of the susceptor; and
   means for controlling the atmosphere within the susceptor.

20. The apparatus of claim 19 wherein the means for controlling the atmosphere within the susceptor further includes means for isolating the susceptor interior from the chamber, and a vacuum pump system in fluid communication with the susceptor interior.

21. The apparatus of claim 19 wherein the means for controlling the atmosphere within the susceptor further includes means for isolating the susceptor interior from the chamber, and a gas source, wherein the gas source is selected from the group consisting of an inert gas, a reducing gas and combinations thereof, the gas source being in fluid communication with the susceptor.

22. The apparatus of claim 21 wherein the susceptor further includes openings between the susceptor interior and the chamber and the means for isolating the susceptor interior from the chamber includes covers positioned over the susceptor openings.

23. The apparatus of claim 19 wherein the means for controlling the atmosphere further includes a pressure sensor positioned within the susceptor interior for sensing the pressure of the gas within the susceptor, a pressure regulator for regulating the flow of gas from the gas source to the susceptor interior, and a controller in communication with the pressure sensor and the regulator to adjust the flow of gas through the pressure regulator in response to the pressure of gas within the susceptor interior.

24. A susceptor for holding components requiring brazing and the components at a substantially uniform temperature, within ±15° F., during thermal cycling, the susceptor comprising:

an interior for receiving components, the interior having a circular cross-sectional configuration and a diameter of up to about 24 inches;

a wall forming the boundary between the susceptor interior and an exterior to the susceptor;

the susceptor interior of a size sufficiently large for receiving components having a cross-sectional size up to about 24 inches in cross-section, wherein heating of the susceptor is accomplished at temperatures above about liquidus temperature of a brazing material and below the melting temperature of materials comprising the components, without deterioration of the susceptor resulting from oxidation, thermal shock and thermal fatigue, and wherein the susceptor is a good thermal conductor and radiates heat to its interior.

25. The susceptor of claim 24 wherein a susceptor material is selected from the group consisting of refractory metals from Groups IVA, VA and VIA of the Periodic Table of elements and alloys of these refractory metals.

26. The susceptor of claim 25 wherein the susceptor material is selected from the group consisting of tantalum, molybdenum, titanium, tungsten and alloys of these metals.

27. The susceptor of claim 24 wherein a susceptor material is graphite.

28. The susceptor of claim 24 wherein a susceptor material is platinum.

29. The susceptor of claim 24 wherein the susceptor has a melting temperature above about 2300° F. and in is oxidation resistant and resistant to thermal shock in the range of up to about 2300–2400° F.

* * * * *

UNITED STATES PATENT AND TRADEMARK OFFICE
CERTIFICATE OF CORRECTION

PATENT NO. : 6,649,887 B2
DATED : November 18, 2003
INVENTOR(S) : David Edwin Budinger It is certified that error appears in the above-identified patent and that said Letters Patent is hereby corrected as shown below:

<u>Column 6,</u>
Line 48, delete "201".

<u>Column 11,</u>
Line 4, "and the components" should read -- and maintaining the components --.

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,649,887 B2
DATED         : November 18, 2003
INVENTOR(S)   : David Edwin Budinger It is certified that error appears in the above-identified patent and that said Letters Patent is hereby corrected as shown below:

The title page, showing an illustrative fig, should be deleted and substitute therefor the attached page.

Delete Drawing Sheets 1 and 2 and substitute therefor the Drawing Sheets consisting of fig 1 and 2 as shown on the attached pages Column 1,
Line 30, "temperatures experience by aircraft" should read -- temperatures experienced by aircraft --.
Line 33, "and than braze" should read -- and then braze --.
Line 43, "ramping the part to the desired temperatuure" should read -- ramping the parts to the desired temperature --.

Column 3,
Line 38, "the susceptor, if desired after" should read -- the susceptor, if desired, after --.
Line 52, "furnaces, an heat up and cool down" should read -- as heat up and cool down --.

Column 4,
Line 15, "Fig. 1 is a cross-sectional representation of an vaccum" should read -- Fig. 1 is a cross-sectional representation of a vacuum --.

Column 6,
Line 48, should read -- power supplies 201 --.

Column 7,
Line 8, "is must have a melting" should read -- it must have a melting --.

Column 8,
Line 58, "a single induction power can be used" should read -- a single induction power supply can be used --.

Column 11,
Line 16, "about liquidus" should read -- about a liquidus --.
Line 17, "below the metling temperatures" should read -- below a melting temperature --.

UNITED STATES PATENT AND TRADEMARK OFFICE
CERTIFICATE OF CORRECTION

PATENT NO.    : 6,649,887 B2
DATED         : November 18, 2003
INVENTOR(S)   : David Edwin Budinger It is certified that error appears in the above-identified patent and that said Letters Patent is hereby corrected as shown below:

Column 12,
Line 16, "and in is" should read -- and is --.

Signed and Sealed this

Twenty-eighth Day of June, 2005

JON W. DUDAS
*Director of the United States Patent and Trademark Office*

(12) United States Patent
Budinger

(10) Patent No.: US 6,649,887 B2
(45) Date of Patent: Nov. 18, 2003

(54) APPARATUS AND METHOD FOR PROTECTIVE ATMOSPHERE INDUCTION BRAZING OF COMPLEX GEOMETRIES

(75) Inventor: David Edwin Budinger, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/822,127

(22) Filed: Mar. 30, 2001

(65) Prior Publication Data

US 2002/0139794 A1 Oct. 3, 2002

(51) Int. Cl.$^7$ .................................................. H05B 6/10
(52) U.S. Cl. ........................................ 219/615; 219/634
(58) Field of Search ............................ 219/615, 634, 219/602, 607, 604, 635, 616, 617, 627, 544, 643–645; 118/725, 720, 715, 733, 724; 228/194, 121, 195; 438/765; 117/89

(56) References Cited

U.S. PATENT DOCUMENTS

| | | | |
|---|---|---|---|
| 4,622,445 A | * | 11/1986 | Matsen .................. 219/615 |
| 5,194,401 A | * | 3/1993 | Adam et al. ............. 438/765 |
| 6,147,334 A | * | 11/2000 | Hannigan ................ 219/544 |
| 6,368,404 B1 | * | 4/2002 | Gurary et al. ............. 117/89 |

* cited by examiner

Primary Examiner—Quang T. Van
(74) Attorney, Agent, or Firm—Carmen Santa Maria; McNees Wallace & Nurick LLC

(57) ABSTRACT

Apparatus for controlled-atmosphere brazing of parts or components having cross-sectional dimensions of up to twenty-four inches. The apparatus maintains the components or parts at a uniform temperature during the brazing cycle. The apparatus includes a susceptor having a physical boundary that separates an interior of the susceptor from its exterior. While there is no limitation upon the length of the parts or components that can be brazed, the wall of the susceptor formed as a physical boundary has an internal diameter that limits the maximum cross-sectional dimension of the parts or components that are to be brazed, so that the parts or components reside within the interior of the susceptor. A heating source for heating the susceptor is provided. The heating source is capable of heating the susceptor sufficiently so that the interior of the susceptor can reach a temperature sufficient to braze the components inside the susceptor. The susceptor containing the parts to be brazed and heating source are placed within a chamber that can provide a desired protective environment, such as a vacuum, an inert gas atmosphere, a reducing gas or nitrogen. The susceptor conducts and radiates the heat across its physical boundary so that a uniform temperature is attained and maintained within the interior of the susceptor during the brazing cycle. The susceptor is desirably comprised of graphite or a refractory metal.

29 Claims, 3 Drawing Sheets